(12) United States Patent
Lim

(10) Patent No.: US 12,537,259 B2
(45) Date of Patent: Jan. 27, 2026

(54) CYLINDRICAL SECONDARY BATTERY DEGASSING DEVICE

(71) Applicant: APRO CO., LTD, Gunpo-si (KR)

(72) Inventor: Jong Hyun Lim, Gunpo-si (KR)

(73) Assignee: APRO CO., LTD, Gunpo-si (KR)

( * ) Notice: Subject to any disclaimer, the term of this patent is extended or adjusted under 35 U.S.C. 154(b) by 508 days.

(21) Appl. No.: 18/038,039

(22) PCT Filed: Dec. 9, 2021

(86) PCT No.: PCT/KR2021/018571
§ 371 (c)(1),
(2) Date: May 22, 2023

(87) PCT Pub. No.: WO2022/124804
PCT Pub. Date: Jun. 16, 2022

(65) Prior Publication Data
US 2023/0420790 A1    Dec. 28, 2023

(30) Foreign Application Priority Data

Dec. 11, 2020  (KR) .................. 10-2020-0172984

(51) Int. Cl.
*H01M 50/308*  (2021.01)
*H01M 10/04*   (2006.01)
*H01M 10/44*   (2006.01)

(52) U.S. Cl.
CPC ..... *H01M 50/308* (2021.01); *H01M 10/0422* (2013.01); *H01M 10/445* (2013.01)

(58) Field of Classification Search
CPC .................................................. H01M 50/308
See application file for complete search history.

(56) References Cited

U.S. PATENT DOCUMENTS

2020/0303786 A1    9/2020   Hong et al.

FOREIGN PATENT DOCUMENTS

| KR | 10-2006-0115440 A | 11/2006 |
|----|-------------------|---------|
| KR | 10-2011-0046938 A | 5/2011  |
| KR | 10-2019-0132906 A | 11/2019 |
| KR | 10-2020-0004750 A | 1/2020  |
| KR | 10-2020-0005983 A | 1/2020  |
| KR | 10-2133646 B1     | 7/2020  |

OTHER PUBLICATIONS

KR20220046163andTransaltion (Year: 2022).*
International Search Report for PCT/KR2021/018571 mailed Mar. 17, 2022 from Korean Intellectual Property Office.

* cited by examiner

*Primary Examiner* — Brian R Ohara
(74) *Attorney, Agent, or Firm* — Revolution IP, PLLC

(57) ABSTRACT

A cylindrical secondary battery degassing device, in particular, a cylindrical secondary battery degassing device in which gas generated during charging and discharging processes of a cylindrical secondary battery is suctioned and discharged through a vacuum suction module moving along with a charging-and-discharging probe pin being in contact with electrodes of the cylindrical secondary battery to charge and discharge the cylindrical secondary battery, thereby improving a process efficiency in manufacturing the cylindrical secondary battery, preventing the performance deterioration of the cylindrical secondary battery, and reducing time, efforts and costs for the degassing.

4 Claims, 5 Drawing Sheets

(a)

(b)

(a)

(b)

(a)

(b)

CYLINDRICAL SECONDARY BATTERY DEGASSING DEVICE

TECHNICAL FIELD

The disclosure relates to a cylindrical secondary battery degassing device, in particular, a cylindrical secondary battery degassing device in which gas generated during charging and discharging processes of a cylindrical secondary battery is suctioned and discharged through a vacuum suction module moving along with a charging-and-discharging probe pin being in contact with electrodes of the cylindrical secondary battery to charge and discharge the cylindrical secondary battery, thereby improving a process efficiency in manufacturing the cylindrical secondary battery, preventing the performance deterioration of the cylindrical secondary battery, and reducing time, efforts and costs for the degassing.

BACKGROUND ART

In general, a secondary battery refers to a battery that can be repeatedly used through a discharging process where chemical energy is converted into electrical energy and a charging process which is the reverse of the discharging process, and includes a nickel-cadmium (Ni—Cd) battery, a nickel-metal hydride (Ni-MH) battery, a lithium-metal battery, a lithium-ion (Li-ion) battery, a Li-ion polymer battery, etc.

Among such secondary batteries, the lithium secondary batteries have been commercialized and widely used because they have a high energy density and voltage, a long cycle life, and a low self-discharge rate. The lithium secondary battery includes a polymer-type secondary battery, a cylindrical secondary battery, a polygonal secondary battery, etc.

However, a conventional lithium secondary battery has a risk of ignition/explosion when exposed to high temperature. Further, a conventional lithium secondary battery has a risk of ignition/explosion as heated by IR heat even when a large current flows within a short period of time due to overcharging, external short circuit, nail penetration, local crush, etc. For example, gas is generated as a result of reaction between an electrolyte and an electrode and increases the internal pressure of the battery, and thus the lithium secondary battery may explode at a certain pressure or higher.

According to the reaction in the lithium secondary battery, there may be generated various kinds of gases, such as hydrogen, oxygen, nitrogen, carbon monoxide, carbon dioxide, hydrocarbons of $CnH2n-2$ (n=2 to 5), $CnH2n$ (n=2 to 5), or $CnH2n+2$ (n=1 to 5), and other organic gases. Some of the gases generated inside the battery, such as carbon dioxide, are reversible to return back to their original material as being charged under certain conditions, but most of them remains in a gaseous state inside the secondary battery to increase the internal pressure and cause the battery to swell up. The swollen secondary battery may be too thick to be mounted to an electronic or electrical device designed to accommodate the battery, or may have no values of commodities as determined to be defective due to its swelling appearance Therefore, it is very important to degas or discharge the gas generated inside the secondary battery, or to collect and accurately analyze the gas. By degassing or discharging various gasses generated during the operation of the lithium-ion battery, the performance of the secondary battery is not deteriorated, and many other problems are solved. Further, information about the composition and content of the collected gases is useful for developing battery materials, optimizing battery manufacturing processes, and identifying the causes of battery defects.

Meanwhile, it is also necessary to discharge the gas through the degassing and further to collect and analyze the gas even in the case of a can-type cylindrical secondary battery, which has a large discharge capacity, as a cylindrical secondary battery that has recently been developed as an energy source for electric vehicles and power tools. Accordingly, there are required a method of degassing the gas generated inside the cylindrical secondary battery during the charging and discharging processes, and further a method of collecting the gas while avoiding the internal short circuits.

In this regard, Korean Patent No. 10-2133646 (hereinafter, referred to as the "related art") has proposed an apparatus and method for collecting gas generated in the secondary battery as well as charging and discharging the secondary battery, in which a cylindrical lithium-ion battery having a discharging capacity of about 1000 to 5000 mAh is accommodated, and a hole is made in the accommodated cylindrical secondary battery by one touch, thereby quickly collecting gas discharged through the hole.

Further, there has been applied a method of performing a separate degassing process to remove gas present in the cylindrical secondary battery after the cylindrical secondary battery is subjected to the charging and discharging process.

However, the foregoing related art employs a jig having a separate complicated structure, and has a structure for collecting gas from the lateral side of the jig, thereby having disadvantages that the structure is unnecessarily complicated; time, efforts and costs are excessively required to degas the gas generated during the charging and discharging; and more time, efforts and costs than necessary are required in the case of separately performing the degassing process.

DISCLOSURE

Technical Problem

The disclosure is conceived to solve the problems of the related art, and an aspect of the disclosure is to provide a cylindrical secondary battery degassing device in which gas generated during charging and discharging processes of a cylindrical secondary battery is suctioned and discharged through a vacuum suction module moving along with a charging-and-discharging probe pin being in contact with electrodes of the cylindrical secondary battery to charge and discharge the cylindrical secondary battery, thereby improving a process efficiency in manufacturing the cylindrical secondary battery, preventing the performance deterioration of the cylindrical secondary battery, and reducing time, efforts and costs for the degassing.

Technical Solution

According to an embodiment of the disclosure, a cylindrical secondary battery degassing device includes: a mounting plate disposed movably; a charging-and-discharging probe pin mounted to the mounting plate and coming into contact with an electrode of a cylindrical secondary battery to charge and discharge the cylindrical secondary battery; and a vacuum suction module movable along with the charging-and-discharging probe pin, connected to a gas outlet of the cylindrical secondary battery, and configured to suction and discharge gas generated inside the cylindrical secondary battery during charging and discharging processes.

Here, the gas outlet of the cylindrical secondary battery may be formed at the center of the cylindrical secondary battery, and the vacuum suction module may be disposed being inserted in the charging-and-discharging probe pin.

Further, the gas outlet of the cylindrical secondary battery may be positioned off the center of the cylindrical secondary battery, and the vacuum suction module may be disposed being spaced apart from the charging-and-discharging probe pin and mounted to the mounting plate.

Here, the cylindrical secondary battery degassing device may further include an alignment unit configured to align a position of the cylindrical secondary battery, wherein the alignment unit drives the cylindrical secondary battery to rotate so as to align the gas outlet of the cylindrical secondary battery with the vacuum suction module disposed being mounted to the mounting plate.

Advantageous Effects

In the foregoing cylindrical secondary battery degassing device, gas generated during charging and discharging processes of a cylindrical secondary battery is suctioned and discharged through a vacuum suction module moving along with a charging-and-discharging probe pin being in contact with electrodes of the cylindrical secondary battery to charge and discharge the cylindrical secondary battery, thereby having advantages of improving a process efficiency in manufacturing the cylindrical secondary battery, preventing the performance deterioration of the cylindrical secondary battery, and reducing time, efforts and costs for the degassing.

BEST MODE

Figure 1:
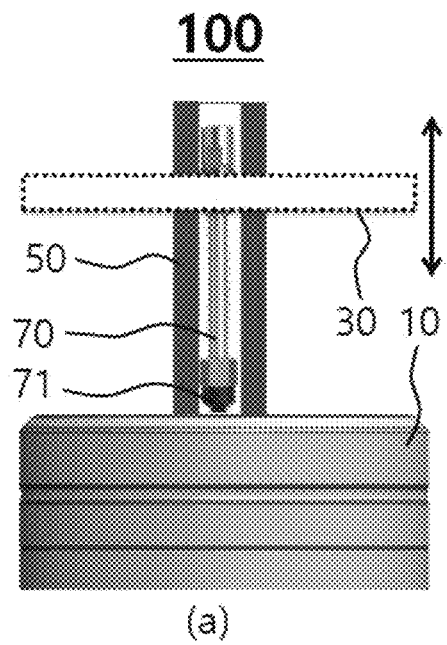
FIG. 1 shows schematic cross-section and bottom views of a cylindrical secondary battery degassing device according to a first embodiment of the disclosure.
Figure 1:
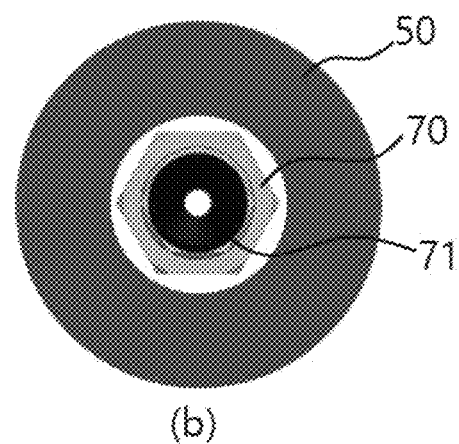

Below, embodiments of a cylindrical secondary battery degassing device with the foregoing problems, solutions and effects according to the disclosure will be described with reference to the accompanying drawings.

The disclosure may be variously modified and have many embodiments, and thus specific embodiments will be illustrated in the accompanying drawings and described in detail. The effects and features of the disclosure, and methods of achieving them will become apparent with reference to the embodiments to be described later in detail in conjunction with the accompanying drawings. However, the disclosure is not limited to the embodiments set forth herein but may be implemented in various forms.

Below, embodiments of the disclosure will be described in detail with reference to the accompanying drawings. In the following description, the same reference numerals are used to designate the same or similar elements throughout the accompanying drawings, and repetitive descriptions thereof will be avoided.

In the following embodiments, terms such as "include" or "have" are merely intended to indicate that the disclosed features or elements are present, but not intended to exclude the possibility that one or more other features or elements are added.

For convenience of description, the elements may be exaggerated or reduced in size throughout the accompanying drawings. For example, the size and thickness of each element shown in the drawings are arbitrarily represented for ease of description, and thus the disclosure is not limited to those shown in the drawings.

If a certain embodiment is implemented in a different way, a specific order of operations may be performed differently from the order described. For example, two operations consecutively described may be performed at substantially the same time, or may be performed in reverse order from that described.

Figure 3:
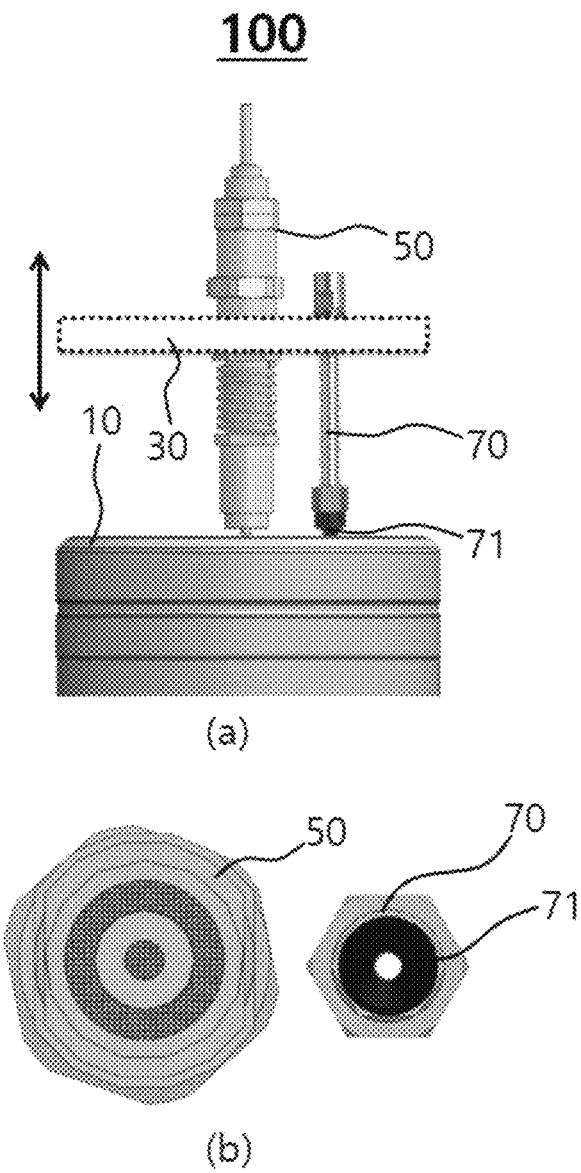
FIG. 3 shows schematic cross-section and bottom views of a cylindrical secondary battery degassing device according to a second embodiment of the disclosure.

FIGS. 1 and 3 show schematic cross-section and bottom views of cylindrical secondary battery degassing devices according to embodiments of the disclosure.

As shown in FIGS. 1 and 3, a cylindrical secondary battery degassing device 100 relates to an apparatus for degassing gas generated during charging and discharging of a cylindrical secondary battery 10.

To this end, the cylindrical secondary battery degassing device 100 according to the disclosure may include a mounting plate 30, a charging-and-discharging probe pin 50 movable being mounted to the mounting plate 30, and a vacuum suction module 70 moving along with the charging-and-discharging probe pin 50 and performing degassing by inhaling and exhaling gas generated during the charging and discharging.

The mounting plate 30 is movably disposed in a charging and discharging device for a cylindrical secondary battery. Here, the mounting plate 30 may have various shapes and include various elements as long as it can move in a vertical direction, a horizontal direction or an oblique direction while the charging-and-discharging probe pin 50 is maintained in a stable state.

For example, the mounting plate 30 may be a pin board to which the charging-and-discharging probe pin 50 is electrically connected and mounted through a socket or the like. The pin board allows the charging-and-discharging probe pin 50 to be stably mounted thereto while being electrically connected thereto, and supplies power to or transmits or receives a signal to and from the charging-and-discharging probe pin 50 for the charging and discharging of the cylindrical secondary battery so that the charging and discharging operations can be carried out. The pin board is movably disposed so that the charging-and-discharging probe pin 50 mounted to the pin board can move in the vertical direction, the horizontal direction or the oblique direction. As the mounting plate 30, the pin board may be moved by a separate actuator.

Further, the mounting plate 30 may be a moving plate provided separately from the pin board. As the mounting plate, the moving plate may be stably mounted with the pin board. The moving plate is movably disposed so that the charging-and-discharging probe pin 50 mounted to the pin board can move in the vertical direction, the horizontal direction, or the oblique direction. As the mounting plate 30, the moving plate may be moved by a separate actuator.

Here, the mounting plate 30 is disposed to be moved by the separate actuator so that the charging-and-discharging probe pin 50 can move in various directions. As shown in FIGS. 1 and 3, it may be ensured that the mounting plate 30 is disposed to be movable in the vertical direction above the cylindrical secondary battery 10.

As described above, the mounting plate 30 is mounted with the charging-and-discharging probe pin 50. The charging-and-discharging probe pin 50 is mounted to the mounting plate 30 and comes into contact with an electrode 13 of the cylindrical secondary battery 10 to charge and discharge the cylindrical secondary battery 10.

Figure 2:
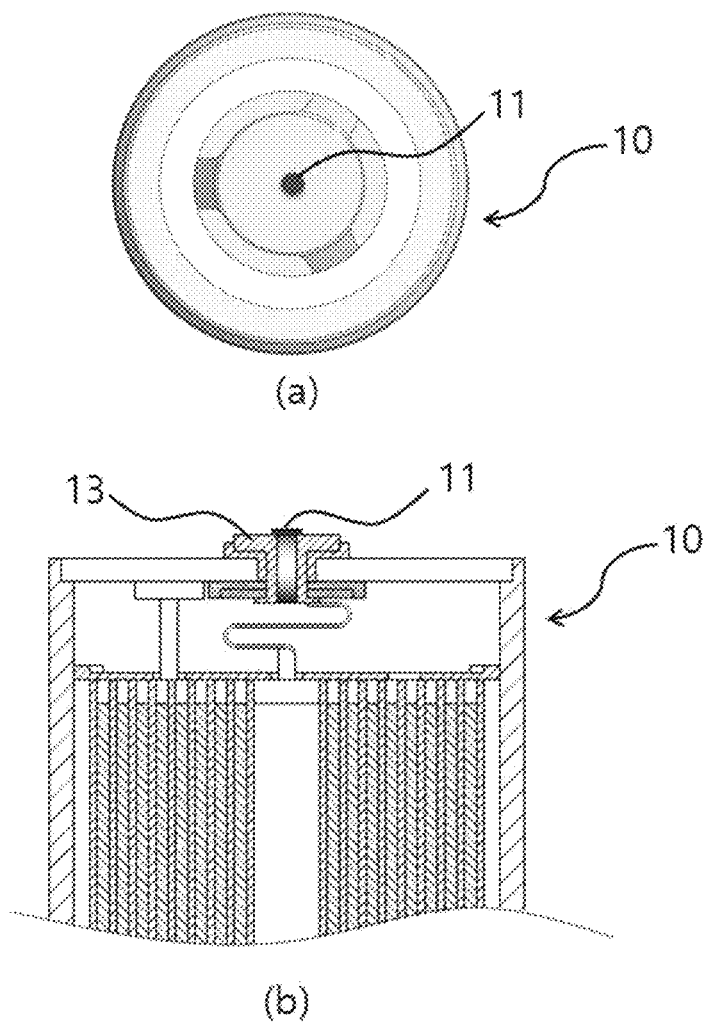
FIG. 2 shows plan and cross-section views of a cylindrical secondary battery applied to FIG. 1.
Figure 4:
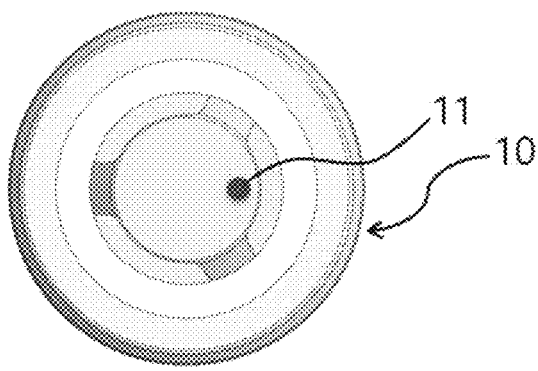
FIG. 4 shows plan and cross-section views of a cylindrical secondary battery applied to FIG. 3.
Figure 4:
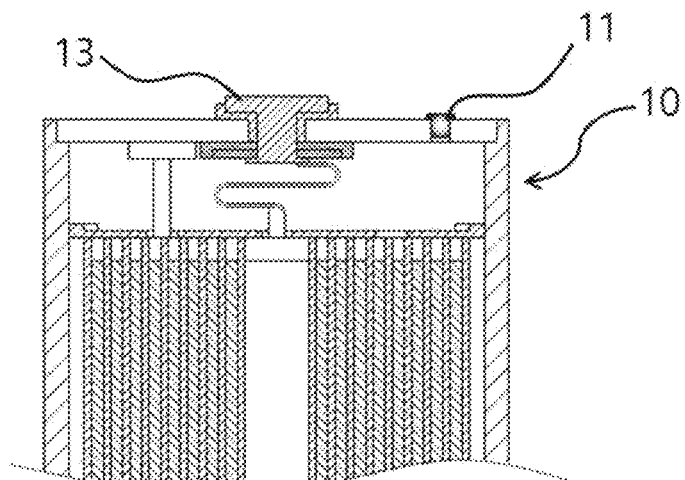

Specifically, as shown in FIGS. 2 and 4, the cylindrical secondary battery 10 includes the electrode 13. The electrode may be disposed at various positions of the cylindrical secondary battery 10, but it is preferable that the electrode 13 of the cylindrical secondary battery 10 according to the disclosure is formed on the top of the cylindrical secondary battery 10.

To perform the charging and discharging process for the cylindrical secondary battery 10, it is necessary to apply and measure voltage and current to the cylindrical secondary battery 10. To this end, the charging-and-discharging probe pin 50 of the charging and discharging device needs to come into contact with the electrode 13 of the cylindrical secondary battery 10.

As described above, the electrode 13 of the cylindrical secondary battery 10 is formed on the top of the cylindrical secondary battery 10, and more particularly in a central portion. Of course, the electrode 13 may be positioned in other portions than the top central portion of the cylindrical secondary battery 10. However, it will be taken into account that the electrode 13 according to the disclosure is positioned in the central portion.

During the charging and discharging process, the charging-and-discharging probe pin 50 moves in the vertical direction while being mounted to the mounting plate 30, and moves down to come into electrical contact with the electrode 13 of the cylindrical secondary battery 10 so that the charging-and-discharging probe pin 50 can be in electrical contact with the electrode 13 formed in the central portion of the cylindrical secondary battery 10.

Therefore, the mounting plate 30 is operated to move in the vertical direction by the separate actuator, and is controlled to vertically move down so that the charging-and-discharging probe pin 50 can come into contact with the electrode 13 of the cylindrical secondary battery 10

In this way, when the charging-and-discharging probe pin 50 comes into contact with and is electrically connected to the electrode 13 of the cylindrical secondary battery 10, a charging and discharging process and a test for the cylindrical secondary battery 10 may be performed by applying voltage and current. However, gas is generated inside the cylindrical secondary battery 10 during the charging and discharging process, and it is thus necessary to perform the degassing by discharging the gas to the outside.

To this end, the cylindrical secondary battery degassing device 100 according to the disclosure is not separately moved and disposed, but moved along with the charging-and-discharging probe pin 50 moved and disposed for the charging and discharging of the cylindrical secondary battery 10, and includes the vacuum suction module 70 to perform the degassing by inhaling and exhaling gas generated in the cylindrical secondary battery 10 while the charging-and-discharging probe pin 50 is being in contact with the electrode 13 of the cylindrical secondary battery 10.

As shown in FIGS. 1 and 3, the vacuum suction module 70 moves along with the charging-and-discharging probe pin 50, is connected to a gas outlet 11 of the cylindrical secondary battery 10, and performs an operation of inhaling and exhaling gas generated in the cylindrical secondary battery 10 during the charging and discharging process.

Specifically, when the mounting plate 30 is moved down so that the charging-and-discharging probe pin 50 can come into contact with the electrode 13 of the cylindrical secondary battery 10 so as to perform the charging and discharging process for the cylindrical secondary battery 10, the vacuum suction module 70 is connected to the gas outlet 11 formed in the cylindrical secondary battery 10. In other words, when the charging-and-discharging probe pin 50 is in contact with the electrode 13 of the cylindrical secondary battery 10, the vacuum suction module 70 is connected to the gas outlet 11 formed on the top of the cylindrical secondary battery 10.

The gas outlet 11 formed in the cylindrical secondary battery 10 is positioned on the top of the cylindrical secondary battery 10. Specifically, the gas outlet 11 may, as shown in FIG. 2, be positioned in the center of the cylindrical secondary battery 10, or, as shown in FIG. 4, be positioned off the center of the cylindrical secondary battery 10. In this regard, details will be described later.

The gas outlet 11 of the cylindrical secondary battery 10 may be variously shaped and disposed as long as it is structured to connect with the vacuum suction module 70 and easily discharge gas generated in the cylindrical secondary battery 10 during the charging and discharging process.

When the charging-and-discharging probe pin 50 is in contact with the electrode 13 of the cylindrical secondary battery 10, the vacuum suction module 70 may have a structure to be easily connected to the gas outlet 11 of the cylindrical secondary battery 10 and to be sealed to maintain airtightness from the outside in the connected state.

To this end, a vacuum pad 71 is provided in a lower portion of the vacuum suction module 70. When the charging-and-discharging probe pin 50 moves down in the vertical direction and comes into contact with the electrode 13 of the cylindrical secondary battery 10, the vacuum pad 71 may be in close contact with or connected to the gas outlet 11 of the cylindrical secondary battery 10 so as to communicate with the gas outlet 11, thereby maintaining the sealing state from the outside.

In this state, when a separately configured vacuum suction device (not shown) is connected to an upper side of the vacuum suction module 70 and performs a suction operation, the inside of the vacuum suction module 70 becomes vacuum and gas generated inside the cylindrical secondary battery 10 is suctioned and discharged to the outside through the gas outlet 11 and the vacuum suction module 70, thereby carrying out the degassing.

MODE FOR INVENTION

As described above, the gas outlet 11 of the cylindrical secondary battery 10 according to the disclosure may be positioned in the center or off the center of the cylindrical secondary battery 10.

Specifically, the gas outlet 11 of the cylindrical secondary battery 10 according to an embodiment may, as shown in FIG. 2, be formed at the center of the cylindrical secondary battery 10, and the vacuum suction module 70 may, as shown in FIG. 1, be inserted and disposed in the charging-and-discharging probe pin 50.

The gas outlet 11 of the cylindrical secondary battery 10 is formed at the center of the cylindrical secondary battery 10, and thus disposed inside or adjacent to the electrode 13 of the cylindrical secondary battery 10. Because the charging-and-discharging probe pin 50 is in contact with the electrode 13 of the cylindrical secondary battery 10 during the charging and discharging process, and the gas outlet 11 of the cylindrical secondary battery 10 is formed at the center of the cylindrical secondary battery 10, it is most preferable structurally that the vacuum suction module 70 is inserted and disposed in the charging-and-discharging probe pin 50.

As a result, when the charging-and-discharging probe pin 50 comes into contact with the electrode 13 of the cylindrical secondary battery 10 as the mounting plate 30 moves down in the vertical direction, the vacuum pad 71 of the vacuum suction module 70 inserted and disposed in the charging-and-discharging probe pin 50 may be in contact with or connected to the gas outlet 11 of the cylindrical secondary battery 10 so as to communicate with the gas outlet 11.

The gas outlet 11 of the cylindrical secondary battery 10 according to another embodiment may, as shown in FIG. 4, be positioned off the center of the cylindrical secondary battery 10, and, correspondingly, the vacuum suction module 70 may, as shown in FIG. 3, be disposed being mounted to the mounting plate 30 as spaced apart from the charging-and-discharging probe pin 50.

Because the gas outlet 11 of the cylindrical secondary battery 10 is positioned off the center of the cylindrical secondary battery 10, the gas outlet 11 is spaced apart from the electrode 13 formed at the center of the cylindrical secondary battery 10. Because the charging-and-discharging probe pin 50 comes into contact with the electrode 13 formed at the center of the cylindrical secondary battery 10 during the charging and discharging process but the gas outlet 11 of the cylindrical secondary battery 10 is positioned off the center of the cylindrical secondary battery 10, it is most preferable structurally that the vacuum suction module 70 is disposed to be spaced apart from the charging-and-discharging probe pin 50 and mounted to the mounting plate 30 so as to move along with the charging-and-discharging probe pin 50.

As a result, when the charging-and-discharging probe pin 50 comes into contact with the electrode 13 of the cylindrical secondary battery 10 as the mounting plate 30 moves down in the vertical direction, the vacuum pad 71 of the vacuum suction module 70 disposed being mounted to the mounting plate 30 as spaced apart from the charging-and-discharging probe pin 50 may be in contact with or connected to the gas outlet 11 positioned off the center of the cylindrical secondary battery 10 so as to communicate with the gas outlet 11.

Here, while the charging-and-discharging probe pin 50 moves down in the vertical direction and comes into contact with the electrode 13 of the cylindrical secondary battery 10, the vacuum suction module 70 may be disposed being mounted to the mounting plate 30, to which the charging-and-discharging probe pin 50 is mounted, so that the vacuum suction module 70 can move along with the charging-and-discharging probe pin 50 and be in contact with or connected to the gas outlet 11 positioned off the center of the cylindrical secondary battery 10 in order to communicate with the gas outlet 11. Therefore, when the mounting plate 30 moves down in the vertical direction by a certain stroke, the charging-and-discharging probe pin 50 comes into contact with the electrode 13 of the cylindrical secondary battery 10 and at the same time the vacuum suction module 70 is in contact with and connected to the gas outlet 11 of the cylindrical secondary battery 10 so as to communicate with the gas outlet 11.

Meanwhile, in the cylindrical secondary battery degassing device 10 shown in FIGS. 1 and 2, the vacuum suction module 70 may be in contact with and connected to the gas outlet 11 of the cylindrical secondary battery 10 so as to communicate with the gas outlet 11 as the charging-and-discharging probe pin 50 vertically moves down while being aligned with a top central portion of the cylindrical secondary battery 10.

On the other hand, in the cylindrical secondary battery degassing device 10 shown in FIGS. 3 and 4, even though the charging-and-discharging probe pin 50 vertically moves down while being aligned with the top central portion of the cylindrical secondary battery 10, it is not ensured that the vacuum suction module 70 is in contact with and connected to the gas outlet 11 of the cylindrical secondary battery 10 so as to communicate with the gas outlet 11 because the vacuum suction module 70 is mounted to the mounting plate 30 while being spaced apart from the charging-and-discharging probe pin 500 and the gas outlet 11 of the cylindrical secondary battery 10 is positioned off the center of the cylindrical secondary battery 10.

Figure 5:
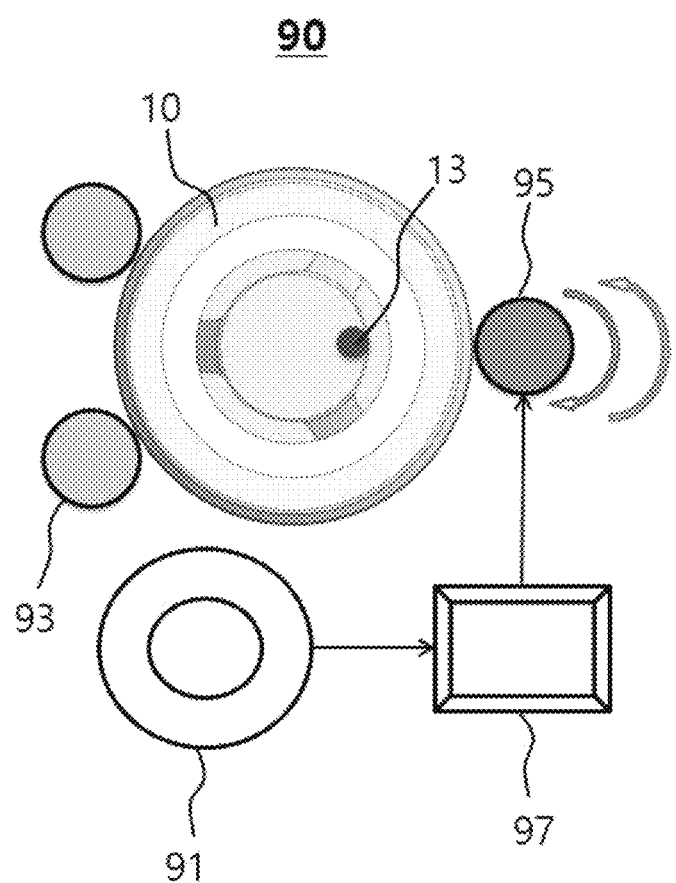
FIG. 5 shows a schematic configuration view of an alignment unit included in the cylindrical secondary battery degassing device shown in FIG. 3.

To this end, the cylindrical secondary battery degassing device 100 according to an embodiment of the disclosure may further include an alignment unit 90 as shown in FIG. 5. In other words, the cylindrical secondary battery degassing device 100 according to the disclosure, shown in FIGS. 3 and 4, further include the alignment unit 90 for the position alignment of the cylindrical secondary battery 10, in which the alignment unit 90 drives the cylindrical secondary battery 10 to rotate so that the gas outlet 11 of the cylindrical secondary battery 10 can be aligned with the vacuum suction module 70 disposed being mounted to the mounting plate 30.

Specifically, the alignment unit 90 performs an operation of rotating the cylindrical secondary battery 10 so that the gas outlet 11 of the cylindrical secondary battery 10 shown in FIG. 4 and the vacuum suction module 70 mounted to the mounting plate 30 can align in the vertical direction. Therefore, when the charging-and-discharging probe pin 50 vertically moves down while being assigned with the top central portion of the cylindrical secondary battery 10 by the alignment unit 90, the vacuum suction module 70 is in contact with and connected to the gas outlet 11 of the cylindrical secondary battery 10 so as to communicate with the gas outlet 11.

The alignment of the cylindrical secondary battery 10 by the alignment unit 90 may be carried out before or after loading the cylindrical secondary battery 10 to a charging and discharging tray where a plurality of cylindrical secondary batteries is accommodated and mounted. In other words, the cylindrical secondary battery 10 may be aligned by the alignment unit 90 before being loaded to the tray for the charging and discharging, and the aligned cylindrical secondary battery 10 may be loaded to the charging and discharging tray. As necessary, the cylindrical secondary battery 10 may be first loaded to the charging and discharging tray, and then subjected to the alignment of the alignment unit 90 while being mounted to the charging and discharging tray.

The alignment unit 90 in the former case may be separately configured being spaced apart from the tray for the charging and discharging, and the alignment unit 90 in the latter case may be mounted to or disposed adjacent to the tray for the charging and discharging. In the latter case unlike the former case, the plurality of cylindrical secondary batteries 10 mounted to the charging and discharging tray are subjected to the alignment by the alignment unit 90 at a time, thereby having an effect on reducing time, efforts and costs taken in aligning the plurality of cylindrical secondary batteries 10 for the charging and discharging.

The alignment unit 90 may be implemented by various shapes and methods as long as it can rotate the cylindrical secondary battery 10 to align the vacuum suction module 70 disposed being mounted to the mounting plate 30 with the gas outlet 11 of the cylindrical secondary battery 10 in the vertical direction.

A specific exemplary configuration of the alignment unit 90 is as follows. As shown in FIG. 5, the alignment unit 90 includes an idle roller 93 for contact-supporting the cylindrical secondary battery 10 not to be separated, a driving roller 95 for driving the cylindrical secondary battery 10 contact-supported on the idle rollers 93 to rotate, a vision unit 91 for taking a position image of the gas outlet 11 of the cylindrical secondary battery 10, and a controller 97 for controlling the driving roller 95 to align the gas outlet 11 of the cylindrical secondary battery 10 with the vacuum suction module 70 disposed being mounted to the mounting plate 30 in the vertical direction in consideration of the position of the gas outlet 11 of the cylindrical secondary battery 10 identified based on image information received from the vision unit 91.

The idle roller 93 contact-supports the lateral side of the cylindrical secondary battery 10 not to be separated when the cylindrical secondary battery 10 is driven to rotate by the driving roller 95. At least two idle rollers 93 are provided, and the at least two idle rollers 93 are spaced apart from each other and disposed to contact-support the lateral side of the cylindrical secondary battery 10. Each idle roller 93 contact-supports the cylindrical secondary battery 10 and allows the cylindrical secondary battery 10 to rotate naturally without resistance when driven to rotate by the driving roller 95.

The driving roller 95 rotates the cylindrical secondary battery 10 under control of the controller 97. To this end, the driving roller 95 is disposed to be in contact with the lateral side of the cylindrical secondary battery 10, and rotated under control of the controller 97, thereby rotating the cylindrical secondary battery 10. In this process, the cylindrical secondary battery 10 is rotatably contact-supported on the idle roller 93 when driven to rotate by the driving roller 95, and thus rotated without being separated. As a result, the gas outlet 11 of the cylindrical secondary battery 10 is vertically aligned with the vacuum suction module 70 disposed being mounted to the mounting plate 30.

The vision unit 91 takes an image of the cylindrical secondary battery 10 and transmits the image to the controller 97. Based on the image, the controller 97 may identify the position of the gas outlet 11 of the cylindrical secondary battery 10, calculate a rotated value of the cylindrical secondary battery 10 in consideration of the identified position of the gas outlet 11, and calculate a rotation driving value of the driving roller 95. As a result, the controller 97 may control the driving roller 95 to vertically align the gas outlet 11 of the cylindrical secondary battery 10 with the vacuum suction module 70 disposed being mounted to the mounting plate 30, in consideration of the position of the gas outlet 11 of the cylindrical secondary battery 10, which can be identified based on the image information of the cylindrical secondary battery 10 received from the vision unit 91.

Meanwhile, when the alignment unit 90 described as above is mounted to or disposed adjacent to the foregoing charging and discharging tray, the idle rollers 93 and the driving rollers 95 may be disposed one-to-one corresponding to the respective cylindrical secondary batteries 10 mounted to the charging and discharging tray, and at least one vision unit 91 may be configured to take an image of the plurality of cylindrical secondary batteries 10 mounted to the charging and discharging tray, in which the vision unit 91 may be stationarily disposed or may be movably disposed to scan the plurality of cylindrical secondary batteries 10.

As a result, the controller 97 may identify the position of the gas outlet 11 of each cylindrical secondary battery 10 based on the image information of the plurality of cylindrical secondary batteries 10 mounted to the charging and discharging tray, the image of which has been taken by the vision unit 91, and control the driving roller 95 disposed corresponding to each cylindrical secondary battery 10 in consideration of the identified position, thereby controlling the driving roller 95 to vertically align the gas outlet 11 of each cylindrical secondary battery 10 with the corresponding vacuum suction module 70 disposed being mounted to the mounting plate 30.

Meanwhile, when the idle roller 93 and the driving roller 95 are disposed one-to-one corresponding to the respective cylindrical secondary batteries 10 mounted to the charging and discharging tray, the idle roller 93 and the driving roller 95 may be movably disposed not to interfere with the cylindrical secondary battery 10 loaded to or unloaded from the charging and discharging tray.

Therefore, the idle roller 93 and the driving roller 95 are being spaced apart from the mounting position of the cylindrical secondary battery 10 while the cylindrical secondary battery 10 is loaded to or unloaded from the charging and discharging tray, and are moved to be disposed being in contact with the lateral side of the cylindrical secondary battery 10 when the cylindrical secondary battery 10 is loaded and mounted to the charging and discharging tray.

In a cylindrical secondary battery degassing device described above, gas generated during charging and discharging processes of a cylindrical secondary battery is suctioned and discharged through a vacuum suction module moving along with a charging-and-discharging probe pin being in contact with electrodes of the cylindrical secondary battery to charge and discharge the cylindrical secondary battery, thereby exhibiting distinctive effects on improving a process efficiency in manufacturing the cylindrical secondary battery, preventing the performance deterioration of the cylindrical secondary battery, and reducing time, efforts and costs for the degassing.

Although a few embodiments of the disclosure have been described above, it will be apparent for a person having ordinary knowledge in the art that these descriptions are for the illustrative purposes only and various changes can be made without departing from the scope of the disclosure. Accordingly, the genuine technical scope of the disclosure should be defined by the appended claims.

INDUSTRIAL APPLICABILITY

A cylindrical secondary battery degassing device according to the disclosure is industrially applicable to improve a process efficiency in manufacturing the cylindrical secondary battery, prevent the performance deterioration of the cylindrical secondary battery, and reduce time, efforts and costs for degassing because gas generated during charging and discharging processes of a cylindrical secondary battery is suctioned and discharged through a vacuum suction module moving along with a charging-and-discharging probe pin being in contact with electrodes of the cylindrical secondary battery to charge and discharge the cylindrical secondary battery.

The invention claimed is:

1. A cylindrical secondary battery degassing device comprising:
  a mounting plate disposed movably;
  a charging-and-discharging probe pin mounted to the mounting plate and coming into contact with an electrode of a cylindrical secondary battery to charge and discharge the cylindrical secondary battery; and
  a vacuum suction module movable along with the charging-and-discharging probe pin, connected to a gas outlet of the cylindrical secondary battery, and configured to suction and discharge gas generated inside the cylindrical secondary battery during charging and discharging processes.

2. The cylindrical secondary battery degassing device of claim 1, wherein
  the gas outlet of the cylindrical secondary battery is formed at the center of the cylindrical secondary battery, and
  the vacuum suction module is disposed being inserted in the charging-and-discharging probe pin.

3. The cylindrical secondary battery degassing device of claim 1, wherein
  the gas outlet of the cylindrical secondary battery is positioned off the center of the cylindrical secondary battery, and
  the vacuum suction module is disposed being spaced apart from the charging-and-discharging probe pin and mounted to the mounting plate.

4. The cylindrical secondary battery degassing device of claim 3, further comprising an alignment unit configured to align a position of the cylindrical secondary battery,
  wherein the alignment unit drives the cylindrical secondary battery to rotate so as to align the gas outlet of the cylindrical secondary battery with the vacuum suction module disposed being mounted to the mounting plate.

* * * * *